United States Patent

[11] 3,566,169

[72] Inventors: Chester H. Fluder, Wheeling; Marshall Miles; Harry L. Myrent, Wilmette, Ill.
[21] Appl. No. 863,808
[22] Filed Oct. 6, 1969
[45] Patented Feb. 23, 1971
[73] Assignee Vapor Corporation, Chicago, Ill.

[54] MAGNETIC ROTARY PULSE GENERATOR
7 Claims, 11 Drawing Figs.
[52] U.S. Cl. ................................................. 310/155
[51] Int. Cl. ................................................ H02k 21/38
[50] Field of Search ..................................... 310/154, 164, 162, 155

[56] References Cited
FOREIGN PATENTS
6,512,722  3/1966  Netherlands ................. 310/154

Primary Examiner—D. X. Sliney
Attorney—Norman Aon Witt

ABSTRACT: A magnetic rotary pulse generator for producing a speed signal in a vehicle as a direct function of a shaft or axle speed to operate speed indicating apparatus. The generator includes a rotor shaft having a rotor thereon coacting with a stator. A coil assembly includes permanent magnets for producing a magnetic field through the rotor and stator, and a winding in which a signal is generated as a direct function of the speed of the rotor. Coacting teeth in opposed relation are formed on the rotor and stator wherein the matching and mismatching thereof caused by the relative motion therebetween produces a pulsing signal output.

INVENTORS
CHESTER H. FLUDER
MARSHALL MILES
BY HARRY L. MYRENT

ATTORNEY

PATENTED FEB 23 1971
3,566,169
SHEET 2 OF 4
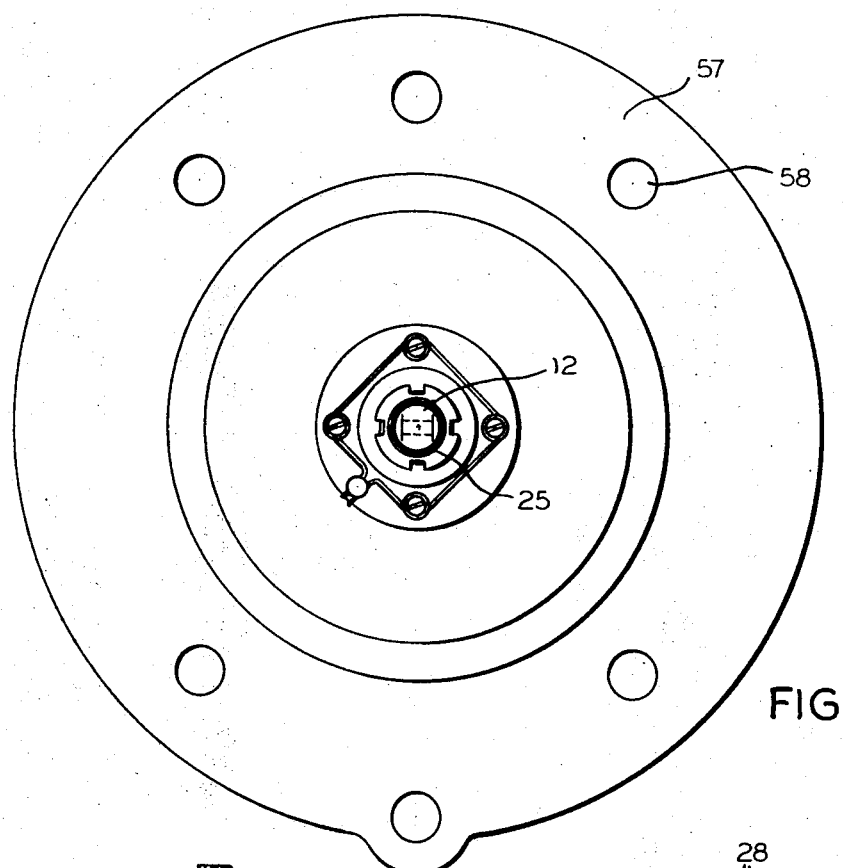
FIG.3
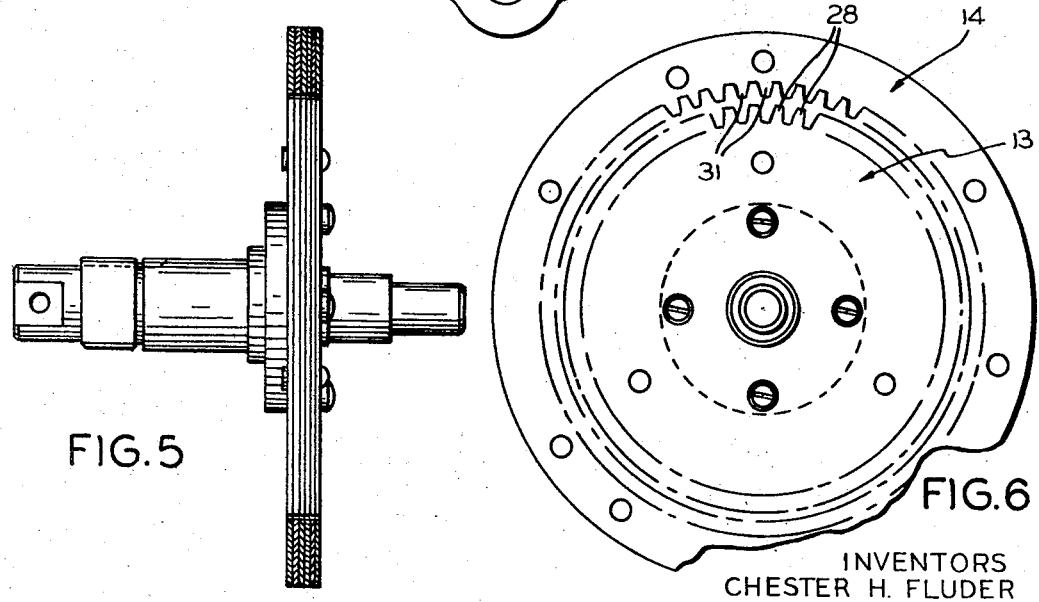
FIG.5
FIG.6
INVENTORS
CHESTER H. FLUDER
MARSHALL MILES
HARRY L. MYRENT
BY
ATTORNEY

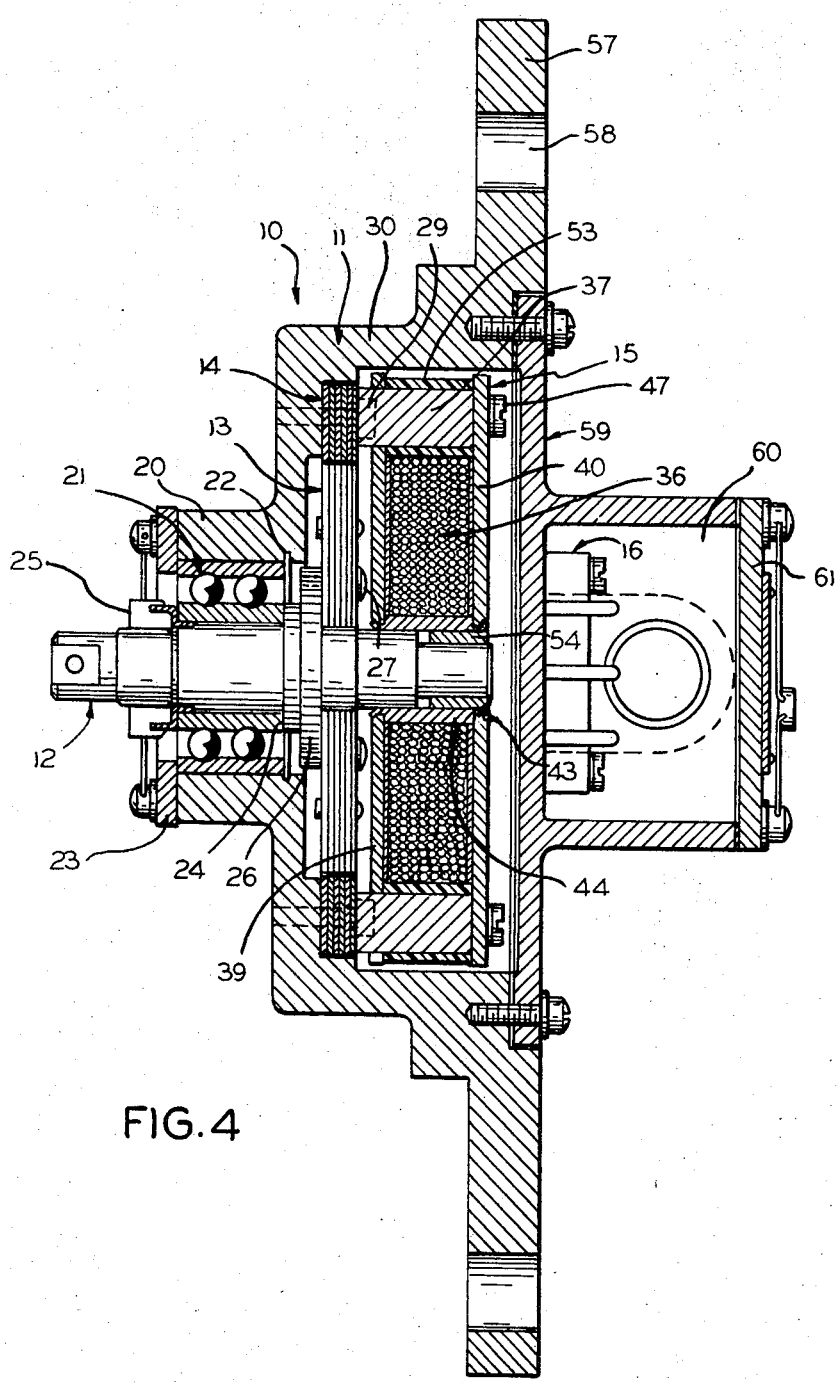

PATENTED FEB23 1971  3,566,169

INVENTORS
CHESTER H. FLUDER
MARSHALL MILES
HARRY L. MYRENT
BY
ATTORNEY

MAGNETIC ROTARY PULSE GENERATOR

This invention relates in general to a generator for producing speed signals to operate speed indicating apparatus on vehicles, and more particularly to a magnetic rotary pulse generator for producing a pulsing signal output for driving a speed indicating device, and still more particularly to a generator for producing a pulsing output signal to speed indicating units on a locomotive.

Heretofore, speed indicating units on locomotives requiring a pulsing signal have employed a signal generator of the type including a pinion gear connected to an axle of a locomotive and coacting with a transducer which would generate a pulse for each tooth of the gear passing thereby. The pulse frequency becomes a function of speed. In order to obtain a sufficient signal to operate speed indicating apparatus, it was necessary to critically space the transducer relative to the outer periphery of the gear teeth. Accordingly, adjustment of the transducer mounting to obtain proper spacing was needed, and quite often maintenance personnel would improperly adjust the transducer thereby causing malfunctioning of the speed indicating units.

The generator of the present invention overcomes the difficulty of heretofore known speed signal indicators in providing a generator that cannot be adjusted and therefore cannot become misadjusted. This reduces maintenance problems. Moreover, the generator of the present invention can be constructed more economically than speed signal generators heretofore known.

The magnetic rotary pulse generator of the invention includes a nonmagnetic housing bearingly supporting a rotor carried on a rotor shaft. The periphery of the rotor is formed with a plurality of circumferentially equally spaced teeth, the very edges of which coact with similarly formed teeth on an annular shaped stator. A magnetic field is induced in the rotor and stator by permanent magnets mounted in a coil assembly. Rotation of the rotor causes matching and mismatching of the teeth on the rotor and stator and the generation of a pulsing current in an output winding on the coil assembly. A pulsed signal output is generated, wherein the pulses per revolution of the rotor equal the number of coacting teeth on the rotor and stator. For example, where 60 teeth are provided on the rotor and 60 teeth are provided on the stator, the output signal will have 60 pulses per revolution. The signal will be in the form of a sine wave, and the pulse frequency is converted to a speed reading. Accordingly, pulses produced in the magnetic field by the matching and mismatching of the rotor and stator teeth, are picked up by an output winding on the coil assembly which would be connected to a speed indicating apparatus.

It is therefore an object of the present invention to provide a new and improved speed signal generator.

Another object of this invention is in the provision of a magnetic rotary pulse generator for producing a pulsing electrical signal as a function of the speed of the rotor, wherein the generator is adapted to be connected to an axle of a locomotive to produce a speed signal for operating a speed indicating apparatus.

Other objects, features and advantages of the invention will be apparent from the following detailed disclosure, taken in conjunction with the accompanying sheets of drawings wherein like reference numerals refer to like parts, in which:

FIG. 3 is an end elevational view of the generator of FIG. 1 looking from the left end;

FIG. 4 is a vertical sectional view taken through the generator and generally along line 4—4 of FIG. 2;

FIG. 5 is an elevational view of the rotor shaft with the rotor mounted thereon;

FIG. 6 is an end elevational view of the rotor and rotor shaft assembly of FIG. 5 looking from the right end, and also of the stator as removed from the generator and as in place in coaction with the rotor;

Figure 2:
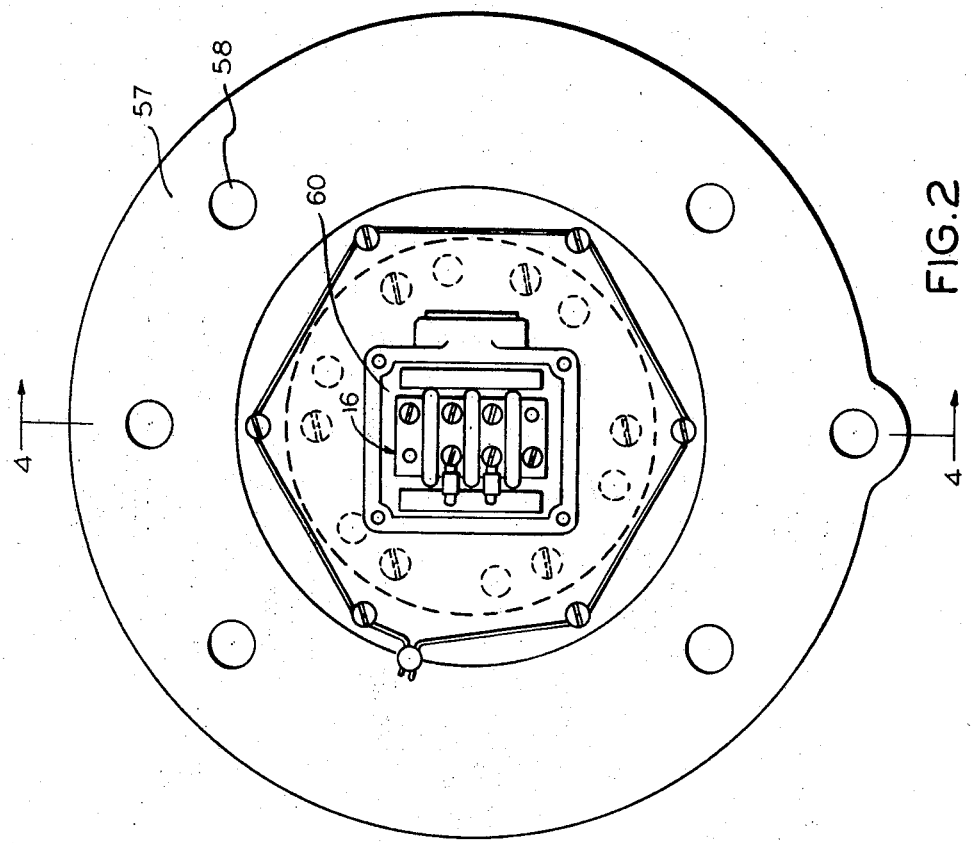
FIG. 2 is an end elevational view of the generator of FIG. 1 looking from the right end with the terminal box cover plate removed.
Figure 1:
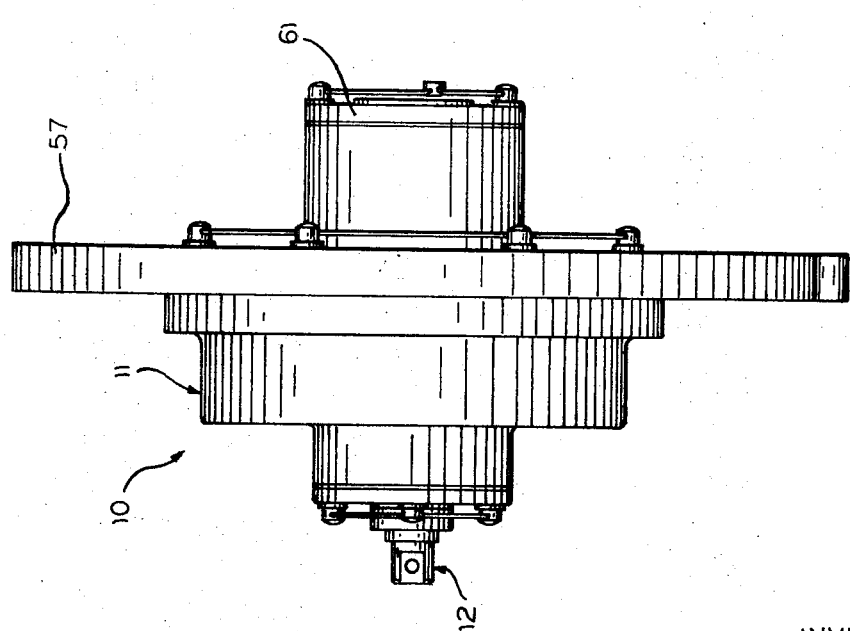
FIG. 1 is a front elevational view of the magnetic rotary pulse generator of the invention.

The magnetic rotary pulse generator is generally indicated by the numeral 10, and is adapted to be mounted on a shaft or axle journal and directly connected to a shaft or axle for producing a speed signal as a function or shaft rotation to be used in speed indicating devices. While the generator 10 is intended to be primarily used with locomotives, it should be recognized that it could be employed with any rolling stock or any vehicles where a speed signal is needed to determine vehicle speed operation of speed indicating apparatus.

The generator includes generally a nonmagnetic housing 11 rotatably supporting a rotor shaft 12 having a rotor 13 mounted thereon, a stator 14 fixed in the housing in coacting relation to the rotor 13, and a coil assembly 15 generating a magnetic field and producing a signal output that is taken from a terminal strip 16 and delivered to the speed indicating apparatus. The rotor shaft 12 is suitably coupled directly to a shaft or axle of a locomotive.

The housing 11 includes a hub 20 having a bearing 21 for bearingly mounting the rotor shaft 12 in the housing. The bearing is maintained in position by a retaining ring 22 at one end and a cover plate 23 at the other end. A shoulder 24 is formed on the rotor shaft 12 to coact with a lock nut 25 threaded on the shaft in spaced relation to lock the shaft to the inner race of the bearing 21. The outer free end of the rotor shaft 12 is formed to facilitate coupling of the shaft to the locomotive shaft.

The rotor 13 includes a plurality of laminations secured together into a unit, preferably by riveting. The rotor is secured to a flange 26 on the rotor shaft by a plurality of fasteners 27. The exterior edge or periphery of the laminated rotor is formed to define a plurality of circumferentially spaced teeth 28, FIG. 6. Similarly, the stator 14 includes a plurality of laminations riveted together. The stator and rotor, together with the rotor shaft are of magnetic material. The stator is in the form of an annulus or ring which is secured to the housing by a plurality of fasteners 29. It will be appreciated that the housing includes a hollow area capable of receiving the rotor, stator and coil assembly, which hollow area is defined generally by an annular wall 30. As also seen in FIG. 6, the inner periphery of the stator 14 is formed to define a plurality of circumferentially spaced teeth 31. The teeth 31, as well as the teeth 28 on the rotor, are equally spaced apart and are equal in number. For example, where the speed indicating equipment is designed to operate on a 60 pulse per axle revolution signal, there would be 60 teeth on the rotor and 60 teeth on the stator arranged so they can be matched and mismatched. It will be appreciated that the rotor and stator are arranged to be in radial alignment with each other, and are of the same width as shown in FIG. 4.

Figure 7:
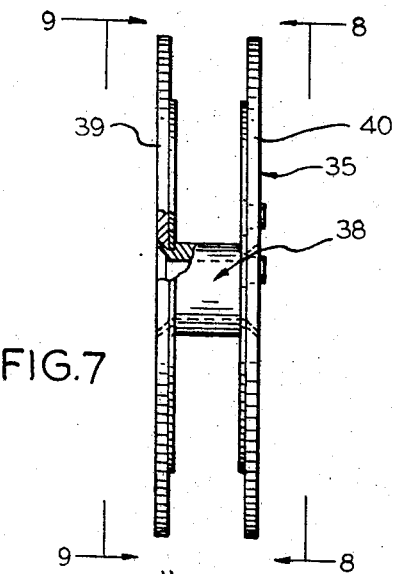
FIG. 7 is a front elevational view of the bobbin for the generator, prior to the addition of the windings and permanent magnets.
Figure 8:
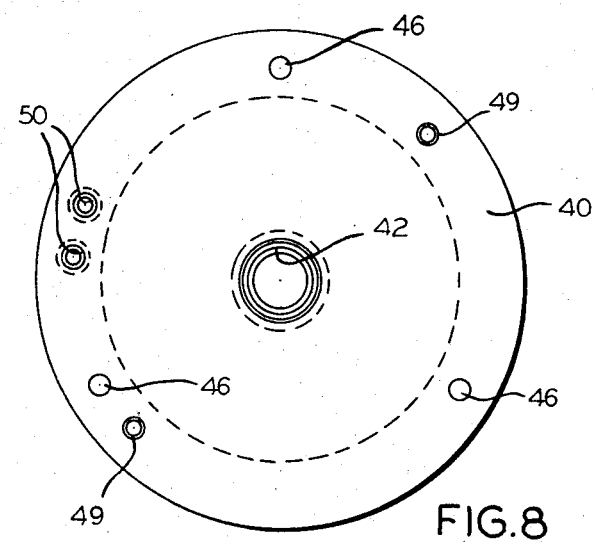
FIG. 8 is a side elevational view of the bobbin of FIG. 7 and looking from the right end.
Figure 10:
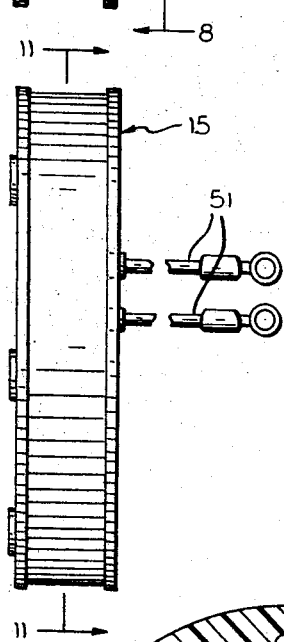
FIG. 10 is a front elevational view of the complete bobbin assembly.
Figure 9:
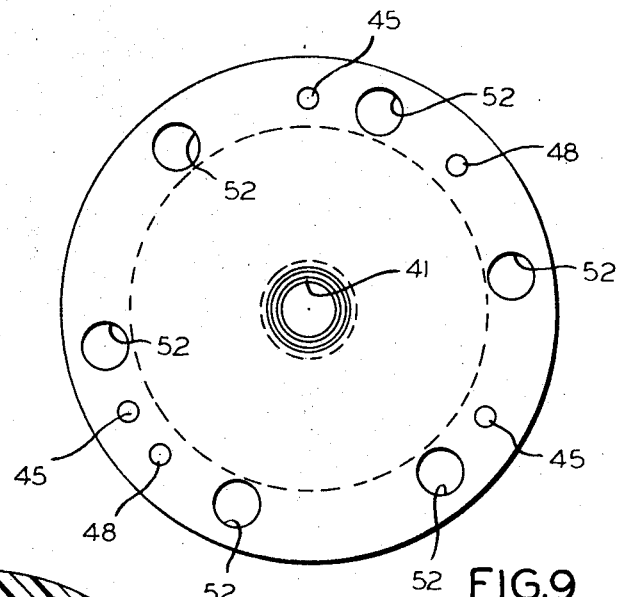
FIG. 9 is a side elevational view of the bobbin of FIG. 7 and looking from the left end.
Figure 11:
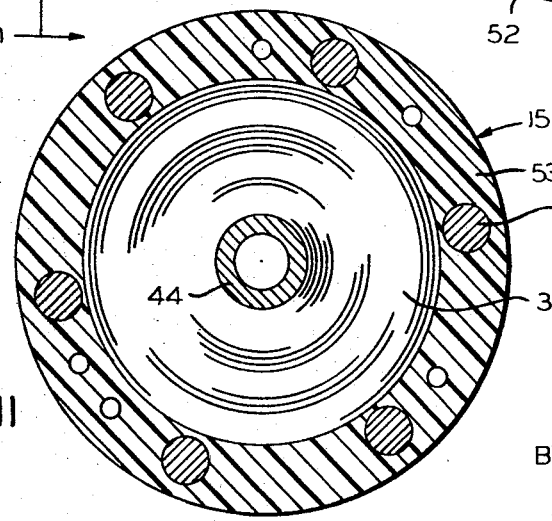
FIG. 11 is a vertical sectional view of the complete bobbin assembly taken substantially along line 11—11 of FIG. 10.

The coil assembly 15 responds to a magnetic field and senses the change in the field intensity as the rotor rotates relative the stator to generate a signal current for the speed indicating equipment. The coil assembly includes a bobbin assembly 35, FIG. 7, a coil winding 36, and a plurality of permanent magnets 37. The bobbin assembly 35 is constructed of a magnetic bobbin or core 38, a circular nonmagnetic electrically conductive front plate 39, and a circular magnetic back plate 40. The front and backplates include respectively aligned holes 41 and 42 to receive end diametrically reduced portions 43 of the bobbin 44, a part of which is peened over to lock the plates to the bobbin. In order to facilitate securing of the coil assembly in the housing 11, holes 45, FIG. 9, in the front plate, align with holes 46, FIG. 8, in the backplate, to receive fasteners 47. The plates are further held together by fasteners extending through holes 48 in the front plate and anchored in aligned tapped holes 49 in the backplate. Holes 50 are formed in the backplate to receive suitable bushings and allow leads 51 to extend therethrough for connecting the winding 36 to the terminal strip 16. The winding is insulated from the plates by suitable insulating washers.

The permanent magnets 37 are cylindrical in shape and bottomed at one end on the magnetic back plate 40, and extend through openings 52 formed in the front plate 39, and bear against one side of the stator 14. While six magnets are shown in the illustrated embodiment, it should be appreciated that any number may be provided depending upon the magnetic strength required to produce the desired signal strength. Moreover, the magnets may take any desired shape. As illustrated, the North pole of the magnets will be at the end adjacent the stator 14. The exterior area between the front and backplates of the coil assembly is filled with epoxy 53.

As seen in FIG. 4, the rear end of the rotor shaft 12 extends through the coil assembly, and to further support the associated end of the rotor shaft relative the coil assembly, a sleeve bearing 54 is mounted in the bobbin 44.

A mounting flange 57 is formed integrally with the annular wall 30 and therefore is a part of the housing, and is provided with holes 58 to receive fasteners and for facilitating the mounting of the generator onto a journal of a locomotive. The housing is closed at its rear end by a cover member 59 which has integrally formed therewith a terminal strip box 60 within which is mounted the terminal strip 16. An outer access plate 61 permits access to the terminal strip box 60.

In operation, the signal output of the generator is obtained by rotation of the rotor shaft 12 and rotor 13. The permanent magnets 37 produce a magnetic field which loops through the stator 14, the rotor 13, the rotor shaft 12 and the backplate 40 of the coil assembly. Matching and mismatching of the teeth on the rotor and stator changes the field intensity and generates a current in the winding 36 in the form of a sine wave. Where 60 teeth are provided on both the stator and rotor, one revolution of the rotor shaft and rotor will produce 60 pulses in the signal output. It will be appreciated that any number of pulses can be generated by changing the number of teeth on the stator and rotor. The nonmagnetic front plate 39 acts as a shorted turn and limits the peak to peak output voltage, and provides a leveling off of the peak output voltage. This is desirable because at maximum speeds encountered, the peak to peak voltages would otherwise be relatively high and could, among other things, cause problems in associated equipment.

It will be understood that modifications and variations may be effected without departing from the scope of the novel concepts of the present invention.

We claim:

1. A magnetic rotary pulse generator, comprising a nonmagnetic housing, a magnetic stator mounted in said housing, a magnetic rotor shaft bearingly mounted in the housing, a magnetic rotor on said rotor shaft and in radial alignment with and of the same width as said stator, opposed teeth on said rotor and stator in spaced coacting relation, said teeth on the rotor and stator being radially opposite, circumferentially equally spaced and of the same number, a magnetic coil assembly with an output winding thereon surrounding said shaft and arranged laterally adjacent the rotor and stator, said coil assembly including a magnetic bobbin assembly having the output winding thereon and means on said coil assembly producing a magnetic field including a plurality of permanent magnets supported on said bobbin assembly.

2. A magnetic rotary pulse generator as defined in claim 1, wherein the coil assembly includes means for limiting the peak output voltage.

3. A magnetic rotary pulse generator as defined in claim 1, wherein the bobbin assembly includes a cylindrical magnetic bobbin surrounding the shaft, a nonmagnetic electrically conductive circular front plate on one end of the bobbin and adjacent the rotor and stator, and a magnetic backplate on the other end of the bobbin.

4. A magnetic rotary pulse generator as defined in claim 3, wherein the permanent magnets extend between and engage the backplate of the bobbin assembly and the stator.

5. A magnetic rotary pulse generator as defined in claim 4, wherein the rotor and stator are laminated.

6. A magnetic rotary pulse generator as defined in claim 5, wherein the shaft extends through said bobbin of said bobbin assembly, and a sleeve bearing is mounted in said bobbin for bearingly supporting one end of the shaft.

7. A magnetic rotary pulse generator, comprising a nonmagnetic housing, an annular magnetic stator mounted in said housing having a plurality of inwardly extending teeth on the inner periphery, said teeth being equally spaced along the inner periphery, a magnetic rotor shaft bearingly supported in the housing and extending normal to said stator and centrally therethrough, a magnetic rotor mounted on said shaft and in alignment with said stator, said rotor having circumferentially and equally spaced teeth on the outer periphery coacting with the stator teeth and in spaced relation therewith, the number of teeth on the stator being equal to the number of teeth on the rotor, a coil assembly secured in said housing laterally adjacent said rotor and stator and including a bobbin assembly having a magnetic bobbin surrounding said shaft, a nonmagnetic front plate adjacent the rotor and stator and mounted on one end of the bobbin limiting the peak output voltage, a magnetic backplate spaced from the front plate and mounted on the other end of said bobbin, a winding on said bobbin assembly and a plurality of permanent magnets mounted on said coil assembly and extending between said backplate and said stator for producing a magnetic field.